United States Patent
Colln

[15] 3,682,910
[45] Aug. 8, 1972

[54] PROCESS FOR PRODUCING THIONOTHIOL-PHOSPHORIC, -PHOSPHONIC, AND -PHOSPHINIC ACID ESTERS

[72] Inventor: Reimer Colln, Wuppertal-Elberfeld, Germany

[73] Assignee: Farbenfabriken Bayer AG., Leverkusen, Germany

[22] Filed: Dec. 5, 1969

[21] Appl. No.: 882,690

[30] Foreign Application Priority Data

June 26, 1966 Germany..................F 49554

[52] U.S. Cl................................260/248 AS, 260/999
[51] Int. Cl.................................C07d 55/08
[58] Field of Search............260/248 AS, 248 CS, 978

[56] References Cited

UNITED STATES PATENTS

| | | |
|---|---|---|
| 2,566,129 | 8/1951 | Hook....................260/978 X |
| 2,586,656 | 2/1952 | Hook....................260/978 X |
| 2,736,738 | 2/1956 | Morris...................260/978 X |
| 2,843,588 | 7/1958 | Lorenz......................260/248 |
| 2,914,530 | 11/1959 | Schrader et al............260/248 |
| 3,257,479 | 6/1966 | Irani et al...............260/978 X |
| 3,294,631 | 12/1966 | Lorenz et al...........260/248 X |

*Primary Examiner*—John M. Ford
*Attorney*—Burgess, Dinklage & Sprung

[57] ABSTRACT

Reacting paraformaldehyde, benzazimide and symmetrical or asymmetrical alkyl, alkenyl, cycloalkyl, alkoxy, cycloalkoxy and/or aryl di-substituted thionothiol -phosphoric, -phosphonic or -phosphinic acid, or one of the latter two mentioned compounds (i.e., benzazimide or thionothiol acid) with the corresponding formaldehyde condensation product of the other, in the presence of hydrogen chloride, to form the corresponding known S-(3,4-dihydro- -phosphoric, -phosphonic or -phosphinic acid esters which possess insecticidal properties.

27 Claims, No Drawings

PROCESS FOR PRODUCING THIONOTHIOL-PHOSPHORIC, -PHOSPHONIC, AND -PHOSPHINIC ACID ESTERS

This application is a continuation-in-part application of copending U.S. Pat. application Ser. No. 645,868, filed June 14, 1967, now abandoned.

The present invention relates to and has for its objects the provision for particular new methods of producing thionothiol -phosphoric, -phosphonic and -phosphinic acid esters, and more particularly symmetrical and asymmetrical alkyl, alkenyl, cycloalkyl, alkoxy, cycloalkoxy and/or aryl di-substituted-S-(3,4-dihydro-4-oxo-1,2,3-benzotriazine-3-yl-methyl)-thionothiol -phosphoric, -phosphonic and -phosphinic acid esters, which are known insecticides, e.g., in a simple single step reaction, using readily available starting materials whereby to attain outstanding yields, with other and further objects of the invention becoming apparent from a study of the within specification and accompanying examples.

These thionothiol -phosphoric, -phosphonic, and -phosphinic acid esters have the general formula:

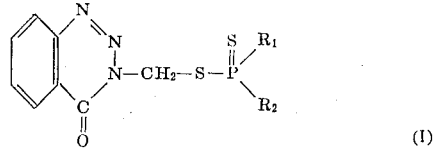

(I)

in which $R_1$ and $R_2$ each respectively represents, i.e., identical or different, alkyl, alkenyl, cycloalkyl, alkoxy, cycloalkoxy or aryl radicals, and as aforesaid such esters are known to be usable as insecticides.

From German Pat. No. 927,270 there is already known a process for the preparation of thiophosphoric acid esters of the above type in which N-halomethyl-benzazimides are reacted with salts of dialkyl -thio- or -thionothiol- phosphoric acids in a suitable solvent, preferably at elevated temperature.

On the basis of the particulars given in German Pat. No. 1,083,827, the corresponding thiol- and thionothiol- phosphonic acid esters can also be obtained by a similar process.

Moreover, in German Pat. No. 1,112,852, among others, the dialkylthionothiolphosphinic acid esters of N-methyl-benzazimide having an analogous formula are also already described.

Finally, British Pat. No. 1,019,570 relates to asymmetrical thiol- or thionothiol- phosphoric acid esters of the aforesaid type as well as a process for their preparation by the reaction of a N-halomethylbenzazimide with an asymmetrical O,O-dialkyl- or O-alkyl-O-cycloalkyl-thiol- or -thionothiol- phosphoric acid.

However, all these known processes have the common disadvantage that when carrying them out it is necessary to start from N-halogenmethyl-benzazimide preferably N-chlormethylbenzazimide, which is obtainable only by a multi-stage and laborious method from benzazimide, formaldehyde and thionylchloride, and which can only be reacted in a further reaction step with the dialkylthiol- or -thionothiol -phosphoric, -phosphonic, and -phosphinic acids concerned, or salts thereof, according to the following equations:

(i)
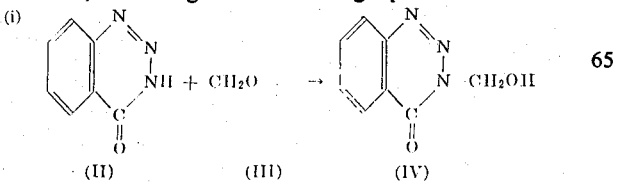
(II)    (III)    (IV)

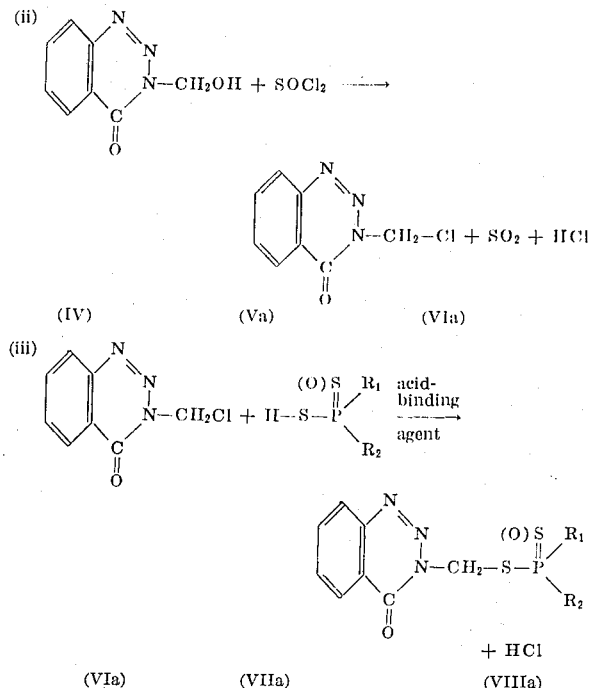

In the above equations, the symbols $R_1$ and $R_2$ are the same as defined above.

It has now been found, in accordance with the present invention, that thionothiol -phosphoric, -phosphonic, and -phosphinic acid esters of formula (I) above, i.e., symmetrical and asymmetrical alkyl, alkenyl, cycloalkyl, alkoxy, cycloalkoxy, and/or aryl di-substituted-S-(3,4-dihydro-4-oxo-1,2,3-benzotriazine-3-yl)-thionothiol -phosphoric, phosphonic, and -phosphinic acid esters, can be obtained much more simply, that is in a one-step reaction and with outstanding yields, by the process which comprises reacting, i.e. condensing, benzazimide, paraformaldehyde and a thionothiol -phosphoric, -phosphonic, or -phosphinic acid of the general formula

(IX)

in which $R_1$ and $R_2$ are the same as defined above, in the presence of aqueous hydrochloric acid or gaseous hydrogen chloride, i.e. preferably at least 37 percent concentration hydrogen chloride, and, if desired, in the presence of an inert organic solvent or diluent.

The course of the process according to the present invention is illustrated, without limitation, by the following reaction scheme:

(iv)

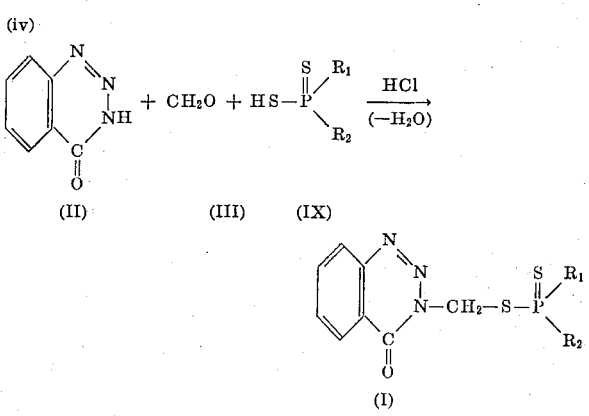

In formulae (I) and (IX), $R_1$ and $R_2$ preferably represent identical or different alkoxy, alkyl or alkenyl radicals with one to four carbon atoms (such as the methoxy, ethoxy, n-propoxy, isopropoxy, n-butoxy, iso-butoxy, sec.-butoxy, methyl, ethyl, n-propyl, iso-propyl, n-butyl, iso-butyl, sec.-butyl, allyl, acryl or isobutenyl radicals) or for the phenyl, cyclohexyl or cyclohexoxy radical.

The smooth course of the reaction according to the process of the present invention is decidedly surprising. In particular, it could not have been foreseen that the reactants would react in the desired manner without acid-binding agents, or even in acid solution at all, nor that the reaction would proceed practically completely uniformly.

The advantages which the process of the present invention exhibits, as compared with the aforementioned known methods of preparation, have been indicated to some extent above. Such advantages include in particular the saving of two formerly indispensible reaction steps, the resulting elimination of the otherwise necessary additional starting materials and steps of isolation of intermediate products, the achievement of better yields, and the obtainment of purer process products; these features collectively improve the economics of the overall preparation of the product.

According to one particular form of carrying out the instant process, instead of formaldehyde, benzazimide and thionothiol -phosphoric, -phosphonic, or -phosphinic acid it is also possible to use the corresponding formaldehyde condensation product of one of the two last-mentioned starting materials, the reaction then proceeding in the following sense:

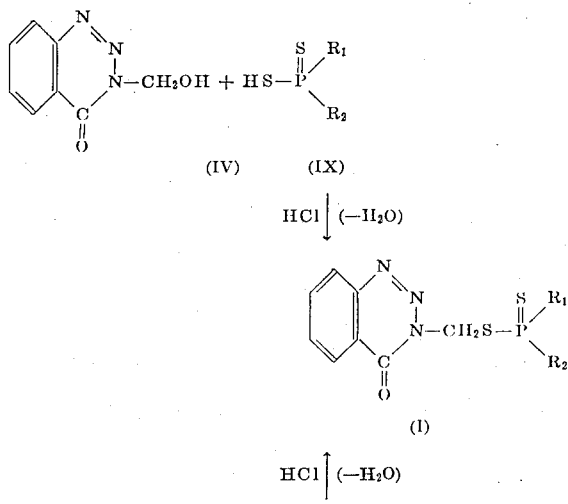

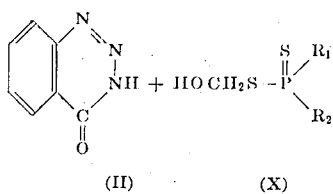

The last-mentioned variants of the instant process offer additional advantages in some cases, for example when the corresponding thionothiol -phosphoric, -phosphonic, or -phosphinic acid S-hydroxymethyl ester (X) is more readily accessible than the free acid (IX) itself or the use of N-hydroxymethyl-benzazimide (IV) appears more expedient for purity or other reasons.

The thionothiol -phosphoric, -phosphonic, and -phosphinic acids of formula (IX) are known from the literature and are readily available, even on an industrial scale. Many of them are available in technology, i.e., industrially, in the form of their aqueous alkali metal or ammonium salt solutions (e.g., sodium, potassium, lithium and ammonium S-salt solutions) and can be used as such insofar as an excess of hydrochloric acid is used which is necessary to liberate the acids involved. The alkali metal chloride or ammonium chloride which is obtained as a by-product when the salt form of the acid of formula (IX) is used may be removed by washing the reaction mixture after completion of the reaction.

The aforementioned alkali metal or ammonium salt solutions usual in technology can, moreover, be readily converted into the corresponding S-hydroxymethyl compounds of the acids of formula (IX) by adding to the former the calculated amount of formaldehyde and hydrochloric acid. Here, despite a water content of about 10 percent, it is directly possible to use in the reaction according to formula scheme (vi) the liquid phase which separates. The thionothiol -phosphoric, -phosphonic, and -phosphinic acid S-hydroxymethyl esters are, in general, less water-soluble than the corresponding free acids and are therefore often obtainable with better yields.

The instant reaction may be carried out in the presence of an inert organic solvent or diluent. As such, in particular (optionally chlorinated) aliphatic and aromatic hydrocarbons, i.e., aliphatic, chlorinated aliphatic, aromatic and chlorinated aromatic hydrocarbons and mixtures thereof, such as benzine, benzene, toluene, xylene, chlorobenzene, methylene chloride, mono-, di-, tri- and tetra-chloroethane, chloroform, carbon tetrachloride, and the like, have given good results; however, the presence of a solvent is not of decisive importance for the success of the reaction, and conveniently the reaction also takes place in the absence of a solvent.

The reaction can be carried out within a fairly wide temperature range. In general, the work is carried out at substantially between about 30° and 80°C, preferably at between about 40° to 60°C.

As can be seen from the above equations, in accordance with the present invention, equimolar amounts of the starting components are normally used. Here it has proved advantageous first to add, e.g., at the stated temperatures and with stirring, the thionothiol - phosphoric, -phosphonic, -phosphinic acid to a solution or suspension of benzazimide and paraformaldehyde in one of the aforementioned solvents or diluents and then to add concentrated hydrochloric acid to this mixture. Thereafter, in order to complete the reaction, the reaction mixture is further stirred for a longer period (e.g., 1 to 3 hours), optionally with heating, the organic phase is separated, washed until there is a neutral reaction, dried and, lastly, freed from solvent under reduced pressure. In most cases, the residue which remains behind solidifies in crystalline form when cooled and left to stand. If, on the other hand, the work is carried out without solvent, the desired product separates as its own, oily phase, or if its melting point is high enough the product separates in crystalline form. In the case of reaction products whose melting point lies only a little above the reaction temperature, the crystalline precipitation of the former can be facilitated by suitable additives, for example methanol. The working up of the mixture takes place in this case by simple filtering off of the precipitate with suction and washing thereof until there is a neutral reaction.

As will be appreciated by the artisan, instead of aqueous hydrochloric acid, gaseous hydrogen chloride can be used equally well, the speed of introduction thereof expediently being adapted to the absorption capacity of the particular mixture, which decreases in the course of the reaction.

Finally, it is advantageous to cause reactions according to the instant process which are carried out with the use of aqueous hydrochloric acid to proceed in an inert gas atmosphere (for example carbon dioxide). Still purer end products are obtained in this way.

By means of the process of the present invention, it has been found that yields of up to well over 80 percent of the theory are obtainable, while the purity of the products has been found, on the average, to be 90 to 96 percent, so that in many cases a further purification thereof can be dispensed with. Should this further purification be desired, however, analytical grade products are readily obtained by simple recrystallization from the usual solvents such as those noted above.

As already mentioned above, the known thionothiol-phosphoric, -phosphonic, and -phosphinic acid esters which can be prepared by the process of the present invention are distinguished by insecticidal properties. They are therefore used on a large scale as pesticides, especially in plant protection endeavors.

The following examples illustrate, without limitation, the particular new production process of the present invention.

EXAMPLE 1

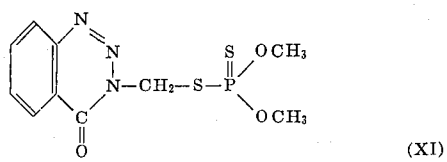

(XI)

a. 79.1g (0.5 mol) 0,0-dimethylthionothiolphosphoric acid and 150 cc concentrated aqueous hydrochloric acid (37 percent) are poured simultaneously, at an internal temperature of 50°C and with stirring, into a suspension of 73.6g (0.5 mol) benzazimide and 15.0g (0.5 mol) paraformaldehyde in 200 cc ethylene chloride. After about 3 minutes the solid portions have dissolved. The reaction does not proceed appreciably exothermally. The mixture is then stirred for 2 hours at 50°C; it is next cooled and the lower, organic phase is separated. This is washed acid-free, first with 150 cc water and then with dilute sodium bicarbonate solution or sodium hydroxide solution, dried over sodium sulfate and freed from solvent under reduced pressure. The yellowish oil which remains behind solidifies in crystalline form when cooled and left to stand; it can then be ground into powder. There are obtained in this way 134.5g (84.8 percent of the theory) of 0,0-dimethyl-S-(3,4-dihydro-4-oxo-1,2,3-benzotriazine-3-yl-methyl)-thionothiolphosphoric acid ester as almost colorless crystals of melting point 63° to 66°C. The product can be obtained in the purest form by recrystallization from methanol (m.p. 73°C). On the basis of the thin-layer chromatogram, mixed melting point and the results of the elementary analysis it is identical with authentic material.

| Analysis of the crude product: Calculated for a molecular weight | P | S | N |
|---|---|---|---|
| of 317.33: | 9.76%; | 20.21%; | 13.24%; |
| Found: | 9.63%; | 20.75%; | 13.12%. | b. When the reaction is carried out in a carbon dioxide atmosphere under otherwise the same reaction and working-up conditions as described under (a), 131.3g (82.9 percent of the theory) of the aforesaid compound are obtained in the form of an almost colorless crystalline product of melting point 65.5° to 68°C.

c. 20 cc methanol are added, at 40°C, to a homogeneous mixture of 14.8g (0.1 mol) benzazimide, 3.0g (0.1 mol) paraformaldehyde, 15.8g (0.1 mol) 0,0-dimethylthionothiolphosphoric acid and 50 cc concentrated hydrochloric acid (37 percent), and the mixture is then stirred for a further 2 hours at 50°C. The reaction product crystallizes out; after cooling, it is filtered by suction, washed until there is a neutral reaction, and dried. 22.1g (69.7 percent of the theory) of the product of the above-mentioned constitution are obtained in the form of colorless crystals of melting point 66° to 67°C.

| Analysis: Calculated for a molecular weight | P | S | N |
|---|---|---|---|
| of 317.33: | 9.76%; | 20.21%; | 13.24%; |
| Found: | 9.59%; | 20.31%; | 12.73%. | d. 31.7g (0.2 mol) 0,0-dimethylthionothiolphosphoric acid and 80 cc of concentrated hydrochloric acid (37 percent) are added simultaneously, at 50°C and with stirring, to a suspension of 35.5g (0.2 mol) N-hydroxymethylbenzazimide in 100 cc ethylene chloride. After the mixture has been stirred for 2 hours at the stated temperature, the organic phase is separated and worked up as described under (a). 46.5g (73.3 percent of the theory) of the above-mentioned product are obtained in the form of a yellowish oil which crystallizes through completely (m.p. 60° to 62°C).

e. A mixture of 73.6g (0.5 mol) benzazimide, 200 cc ethylene chloride, 106g hydrous, 0,0-dimethylthionothiolphosphoric acid S-hydroxymethyl ester and 150 cc concentrated hydrochloric acid (37 percent) is stirred for 2 hours at 50°C, the organic phase is separated after the addition of 25 cc water, and the mixture is worked up as described under (a). 138.5g (87.4 percent of the theory) of the compound of the above structure are obtained in the form of a yellowish oil, which solidifies in completely crystalline form on standing and which then has a melting point of 60° to 62°C.

f. 22g of gaseous hydrogen chloride are introduced, within about 15 minutes and with stirring, into a mixture of 44.2g (0.3 mol) benzazimide, 120 cc ethylene chloride and 64g hydrous 0,0-dimethylthionothiolphosphoric acid S-hydroxymethyl ester at an internal temperature of 50°C; at the beginning of the reaction, the reaction mixture must be somewhat cooled externally. The reaction mixture is then stirred for a further 1¾ hours at 50°C. After cooling the mixture, it is stirred together with 15 cc of water, the lower phase is separated and working up is effected as described above. 88.2g (92.7 percent of the theory) of the product more fully described is obtained as yellowish oil which, on standing, crystallizes through completely and then melts at 63° to 67°C.

percent) is stirred for 2 hours at 50°C; it is then worked up as described under example 1(a) and 47.5g (68.8 percent of the theory) of 0-methyl-0-isopropyl-S-(3,4-dihydro-4-oxo-1,2,3-benzotriazine-3-yl-methyl)-thionothiolphosphoric acid ester are obtained in the form of a yellowish oil with the refractive index $n_D^{24}$= 1.5960 and which, according to the thin-layer chromatogram, is identical with the authentic product and, in particular, is free from the corresponding symmetrical derivatives. The recrystallization from methanol gives colorless crystals of melting point 64°C.

In the same manner as in example 3, the following compounds are obtained:

| | Constitution | Physical properties | Yield (percent of the theory) |
|---|---|---|---|
| (XIV) | N=N, N—CH₂—S—P(=S)(OCH₃)(CH₃) benzotriazinone | M.P. 103–104° C | 72 |
| (XV) | N=N, N—CH₂—S—P(=S)(CH₃)(OC₃H₇ iso) benzotriazinone | Viscous oil, $n_D^{24}=1.6042$ | 63 |
| (XVI) | N=N, N—CH₂—S—P(=S)(CH₃)(CH₃) benzotriazinone | M.P. 160° C | 66.6 |

EXAMPLE 2

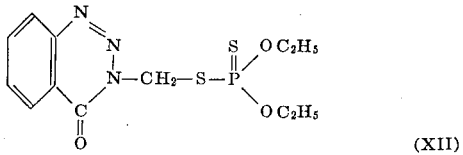

(XII)

38.0g (0.2 mol) 0,0-diethylthionothiolphosphoric acid and 80 cc of concentrated hydrochloric acid (37 percent) are added simultaneously, at 50°C and with stirring, to a mixture of 29.5g (0.2 mol) benzazimide, 6.0g (0.2 mol) paraformaldehyde and 100 cc ethylene chloride and, after stirring for 2 hours at the stated temperature, the mixture is worked up as described in example 1(a). 51.0g (73.8 percent of the theory) of 0,0-diethyl-S-(3,4-dihydro-4-oxo-1,2,3-benzotriazine-3-yl-methyl)-thionothiol-phosphoric acid ester are obtained in the form of a yellowish oil, which gradually solidifies in crystalline form on standing. The product is obtained in purest form by recrystallization from methanol (m.p. 49°C) and is identical with the authentic material.

EXAMPLE 3

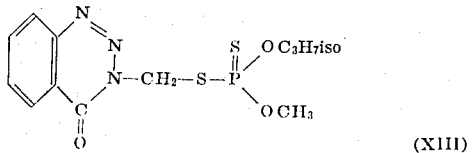

(XIII)

A mixture of 29.5g (0.2 mol) benzazimide, 150 cc ethylene chloride, 43.3g of hydrous 0-methyl-0-isopropyl-thionothiolphosphoric acid S-hydroxymethyl ester and 80 cc of concentrate hydrochloric acid (37

EXAMPLE 4

Using corresponding molar amounts of benzazimide, paraformaldehyde and each of the following thionothiol phosphorus acids, respectively, in accordance with the procedure of example 1(a);

a. Ethyl-allyl-thionothiol phosphinic acid;
b. Cyclopentyl-but-3-enyl-thionothiol phosphinic acid;
c. n-dodecyl-0-tert.-butyl-thionothiol phosphonic acid ester;
d. isopropyl-0-cyclopentyl-thionothiol phosphonic acid ester;
e. t-butyl-phenyl-thionothiol phosphinic acid;
f. Cyclohexyl-0-but-1-enyl-thionothiol phosphonic acid ester;
g. Cyclooctyl-0-cyclohexyl-thionothiol phosphonic acid ester;
h. 0-n-decyl-0-cycloheptyl-thionothiol phosphoric acid ester; and
i. Cyclohexyl-naphth-1-yl-thionothiol phosphinic acid; the corresponding thionothiol phosphorus acid esters are produced:

a'. Ethyl-allyl-S-(3,4-dihydro-4-oxo-1,2,3-benzotriazine-3-yl-methyl)-thionothiol phosphinic acid ester;
b'. Cyclopentyl-but-3-enyl-S-(3,4-dihydro-4-oxo-1,2,3-benzotriazine-3-yl-methyl)-thionothiol phosphinic acid ester;
c'. n-dodecyl-0-tert.-butyl-S-(3,4-dihydro-4-oxo-1,2,3-benzotriazine-3-yl-methyl)-thionothiol phosphonic acid ester;

d'. Isopropyl-0-cyclopentyl-S-(3,4-dihydro-4-oxo-1,2,3-benzotriazine-3-yl-methyl)-thionothiol phosphonic acid ester;

e'. t-butyl-phenyl-S-(3,4-dihydro-4-oxo-1,2,3-benzotriazine-3-yl-methyl)-thionothiol phosphinic acid ester;

f'. Cyclohexyl-0-but-1-enyl-S-(3,4-dihydro-4-oxo-1,2,3-benzotriazine-3-yl-methyl)-thionothiol phosphonic acid ester;

g'. Cyclooctyl-0-cyclohexyl-S-(3,4,-dihydro-4-oxo-1,2,3-benzotriazine-3-yl-methyl)-thionothiol phosphonic acid ester;

h'. 0-n-decyl-0-cycloheptyl-S-(3,4-dihydro-4-oxo-1,2,3-benzotriazine-3-yl-methyl)-thionothiol phosphoric acid ester; and i'. Cyclohexyl-naphth-1-yl-S-(3,4-dihydro-4-oxo-1,2,3-benzotriazine-3-yl-methyl)-thionothiol phosphinic acid ester.

EXAMPLE 5

The process of example 1(a) is repeated using instead the corresponding 0,0-dimethyl thionothiol phosphoric acid sodium salt but this time with 300 cc concentrated aqueous hydrochloric acid (37 percent), and corresponding results are obtained.

EXAMPLE 6

The process of example 1(a) is repeated using instead the corresponding 0,0-dimethyl thionothiol phosphoric acid ammonium salt but this time with 300 cc concentrated aqueous hydrochloric acid (37 percent), and corresponding results are obtained.

In accordance with a preferred embodiment of the present invention, the hydrogen chloride is used in molar excess with respect to the three starting components (i.e. said paraformaldehyde of formula (III), said benzazimide of formula (II), and said thionothiol phosphorus acid of formula (IX); or the corresponding formaldehyde condensation product of one of the two last-mentioned starting materials and the other of said two last-mentioned starting materials; or said paraformaldehyde, benzazimide and the corresponding alkali metal or ammonium salt of said thionothiol phosphorus acid—with a further appropriate excess of hydrogen chloride to liberate such corresponding free thionothiol phosphoric acid). Such hydrogen chloride is preferably in the form of hydrochloric acid having a concentration of at least about 35% HCl, i.e. concentrated hydrochloric acid, and especially at least about 37% HCl, i.e. fuming hydrochloric acid.

In this regard, the hydrochloric acid is preferably used in a 2–6 molar excess with respect to the unit molar quantity of the aforesaid three starting components. Hence, for example, when equimolar quantities of said three starting components are used, at least 3, or at least 4, or at least 5, or at least 6, or 7 or more, mols of hydrochloric acid are used per mol of said paraformaldehyde, benzazimide, and thionothiol phosphorus acid (including appropriately said corresponding formaldehyde condensation products and alkali metal or ammonium salt form of the thionothiol phosphorus acid).

Accordingly, when approximately one mol each of said three starting components is used, 3–7 or 4–7 or 5–7, or 6–7, or 7 or more, mols of at least 35% HCl, or especially at least 37% HCl are used therewith. More particularly, at least 3 mols of at least 35% HCl, or especially at least 37% HCl, are used per mol of the equimolar quantities of said three starting components, i.e. when 1 mol each of said three starting components is used.

In connection with the instant preferred embodiment of the invention, certain further prior art may be considered which is seemingly pertinent.

U.S. Pat. Nos. 2,566,129 and 2,585,656 disclose, inter alia, the reaction of an aldehyde, an amine or amide and a dialkylthiophosphoric acid to form products having a P—S—C—N bonding sequence. Such reaction occurs in the absence of hydrochloric acid.

The technical teaching of U.S. Pat. Nos. 2,566,129 and U.S. Pat. 2,586,656, according to which an amine or amide reacts with an aldehyde and a dialkyldithiophosphoric acid to form products having a P—S—C—N bonding sequence, is not applicable where benzazimide specifically is used instead of such amine or amide. The following test 1a shows this:

TEST 1a

Reaction of benzazimide with formaldehyde and 0,0-dimethyl-dithiophosphoric acid in the absence of HCl A mixture of 14.7 g (0.1 mol) benzazimide, 50 ml ethylene chloride, 3.0 g (0.1 mol) formaldehyde (in the form of paraformaldehyde) and 16.8 g (0.1 mol) of 0,0-dimethyl-dithiophosphoric acid was stirred for 2 hours at an internal temperature of 50°C. A sample of this reaction mixture was when thin-layer chromatographed on silica gel F 254 (Merck) with the running agent petroleum ether-acetone 8:2 next to an authentic sample of the desired condensation product (i.e. 0,0-dimethyl-S-(3,4-dihydro-4-oxo-1,2,3-benzotriazine-3-yl-methyl)-thionothiolphosphoric acid ester). After spraying with PdCl$_2$-reagent (for rendering sulfur compounds visible), it was found that the desired condensation product having the correct $R_F$-value of approximately 0.35 was not at all formed. The entire amount of benzazimide originally added was recovered unchanged from the reaction mixture. Thus, no reaction took place.

Even when this test was repeated for a period of 2½ days, no reaction took place as is clear from the following test 1b:

TEST 1b

Reaction of benzazimide with formaldehyde and 0,0-dimethyl-dithiophosphoric acid in the absence of HCl—extended duration Test 1a was repeated exactly, however for a period of 2½ days at 30°C rather than for 2 hours at 50°C. At the end of this time it was clear that no reaction took place since the entire amount of benzazimide originally added was recovered unchanged from the reaction mixture.

A further test 1c was performed to ascertain the results of carrying out the attempted reaction using the exact corresponding molar quantities of the starting components to those contemplated by example 1 of said U.S. Pat. No. 2,566,129:

TEST 1c

Reaction of benzazimide with formaldehyde and 0,0-dimethyldithiophosphoric acid in the absence of HCl—using procedure analogous to example 1 of U.S. Pat. No. 2,566,129

A mixture of 45.0 g (0.268 mol) of 0,0-dimethyldithiophosphoric acid and 34.8 g (0.237 mol) benzazimide was agitated at room temperature while 19 g (0.234 mol) of 37 percent aqueous formaldehyde solution were added dropwise with stirring. Agitation of the slurry which formed could just about take place, and such agitation was continued at room temperature for 2½ days, after which 120 ml of ethylene chloride were added thereto. Undissolved portions were filtered off. A sample taken from the washed and dried filtrate was then thin-layer chromatographed according to the procedure of test 1a to test for the desired condensation product. Such product, however, was not found.

According to U.S. Pat. No. 2,736,738, a primary amine is reacted with 2 mols formaldehyde and 2 mols 0,0-dialkyldithiophosphoric acid to form products having a P—S—C—N—C—S—P bonding sequence, wherein the primary amine is introduced in the form of the corresponding hydrochloride salt and the reaction medium is made slightly acid with hydrogen chloride. This patent teaching indicates by inference that besides the free amine and the other reaction components, at most approximately 1.1 to 1.2 mol hydrogen chloride per mol amine is present in the reaction mixture, i.e. to provide a slightly acid environment.

Even so, the reaction conditions of U.S. Pat. No. 2,736,738 are completely unsuitable when benzazimide is used instead of a primary amine, as can be seen from the following test 2 analogous to the concept of said patent but in which 2 mols HCl per mol benzazimide are used rather than 1.1 to 1.2 mol as said patent might inferentially be said to teach.

TEST 2

Reaction of benzazimide with formaldehyde and 0,0-dimethyldithiophosphoric acid in the presence of only 2 mols HCl A mixture of 14.7 g (0.1 mol) benzazimide, 3.0 g (0.1 mol) formaldehyde (in the form of paraformaldehyde), 16.8 g (0.1 mol) 0,0-dimethyldithiophosphoric acid and 100 ml of an ethanolic hydrochloric acid containing 7.3 g (0.2 mol) hydrogen chloride was stirred for 2 hours at an internal temperature of 50°C.

The reaction mixture was, as in test 1a, thin-layer chromatographically examined as to the content of the desired condensation product. No trace of such condensation product was found. The entire amount of benzazimide originally added was recovered unchanged from the reaction mixture.

U.S. Pat. No. 3,257,479 concerns the production of reaction products having a P—C—N—C—P bonding sequence but such reaction products and the corresponding orthophosphorous acid starting materials are completely unsuited for a comparison with the instant phosphorus acid starting materials and reaction products formed in accordance with the present invention, to wit, products having a P—S—C—N bonding sequence. Just as in the case of said U.S. Pat. No. 2,736,738, here also the use of hydrogen chloride is only for the purpose of producing the corresponding amine hydrochloride salt, but not to serve as condensation agent. This distinction can be appreciated from the fact that the reaction also takes place without any hydrogen chloride being present at all (see U.S. Pat. No. 3,257,479—examples I, III, V, IX and X). In addition, none of the examples of this patent contains more than 1 mol of hydrogen chloride per mol amine, if at all. In example VII, the amount of the added concentrated hydrochloric acid ("75.6 parts") corresponds only to 0.75 mol HCl per mol benzylamine. As already demonstrated by the above tests 1 and 2, the reaction conditions, e.g. ratios, of U.S. Pat. No. 3,257,479 are also not applicable for effecting the reaction of the present invention.

It cannot be ascertained from any of the above-mentioned patents that the presence of concentrated hydrogen chloride as condensation agent is absolutely necessary, especially for the specific reaction of the present invention, i.e. using benzazimide. If at all, hydrogen chloride is only used in accordance with the teachings of said patents in order to convert the appropriate amine to the corresponding hydrochloric salt, so that the basic reaction of the amine will be neutralized. In the case of the reaction of benzazimide with formaldehyde and an O,O-dialkyldithiophosphoric acid, however, as has been demonstrated by test 2 above, the presence of concentrated hydrogen chloride is necessary far beyond this measure. In order to demonstrate this, a series of experiments in test 3 is provided, such experiments establishing the dependency of the yield of the desired condensation product on the hydrogen chloride concentration in the reaction mixture:

TEST 3

Series of experiments for ascertaining the dependency of the yield on the hydrogen chloride concentration To the mixture of 29.4 g (0.2 mol) benzazimide, 100 ml ethylene chloride and 6.0 g (0.2 mol) formaldehyde (in the form of paraformaldehyde), the following were added simultaneously, while stirring: 33.6 g (0.2 mol) O,O-dimethyl-dithiophosphoric acid and an aqueous hydrochloric acid containing 21.9 g (0.6 mol) hydrogen chloride, which hydrochloric acid has the following concentrations, respectively:

| Experiment | HCl conc. in % by wt. |
|---|---|
| 3a | 37 |
| 3b | 34 |
| 3c | 30 |
| 3d | 25 |
| 3e | 20 |
| 3f | 15 |

The mixture in each case was stirred for 2 hours at an internal temperature of 50°C. If necessary, it was filtered off from the undissolved solid constituents. The organic phase was separated, washed until neutral, dried and freed from the solvent under reduced pressure (up to 2 mm Hg/80°C). The remaining, in some cases later crystallizing, oil, represents the crude product and its quantity represents the crude yield. The following results were obtained:

| Exp. No. | HCl % by Wt. | Crude Yield | % of Theory | Melting Point | Purity |
|---|---|---|---|---|---|
| 3a | 37 | 53.8 g | 84.8 | 63–66°C | 95% |
| 3b | 34 | 49.1 g | 77.5 | 58–60°C | |
| 3c | 30 | 41.8 g | 66.0 | 53–55°C | |
| 3d | 25 | 29.7 g | 46.8 | 41–45°C | |
| 3e | 20 | 13.0 g | 20.5 | soft mass | |
| 3f | 15 | 8.3 g | 13.1 | 0.1 | approx. 0% |

With decreasing hydrogen chloride concentration, the crude yield decreases in a severe manner. As can be seen from the melting points, also the purity of the crude product decreases considerably. While it is not possible to determine an exact content of the crude product when using lower HCl-concentrations, it can be shown at least qualitatively on the basis of the thin layer chromatogram that when using a 15% HCl-concentration, a condensation no longer takes place even though 3 mols of HCl per mol of benzazimide are present. Thin-layer chromatograms of the crude products (0.3 mg each per path) were correspondingly obtained in the experiment series showing the stated HCl concentrations used, the spots being made visible by spraying with $PdCl_2$-solution in the usual way. Such chromatograms show that only by applying concentrated hydrochloric acid (i.e. approximately 37 percent) as condensation agent, can a sufficiently good yield and purity of the final product be achieved.

The optimum is achieved when at least 3 mols of HCl per mol of benzazimide are present in the reaction mixture in the form of concentrated hydrochloric acid, especially 37 percent HCl. Smaller mol amounts, however, result in a decrease in the yield and purity, requiring recrystallization and repurifying of the product.

This may be seen from the following further test:

TEST 4

Series of experiments for ascertaining the dependency of the yield and purity on the number of mols of concentrated (37 percent) hydrochloric acid Test 3 above was repeated exactly, however using the respective molar quantities of HCl noted below:

| Experiment | Grams HCl | Mols HCl (per mol of each of the three starting components) |
|---|---|---|
| 4a | 99 | 5 |
| 4b | 79 | 4 |
| 4c | 59.5 | 3 |
| 4d | 39.6 | 2 |
| 4e | 29.7 | 1.5 |
| 4f | 19.8 | 1 |
| 4g | 9.9 | 0.5 |
| 4h | 0 | 0 |

The following results were obtained:

| Exp. No. | Mols HCl | Crude Yield | % of Theory | Melting Point | Purity |
|---|---|---|---|---|---|
| 4a | 5 | 51.8 g | 80.7 | 62–64°C | satisfactory |
| 4b | 4 | 50.7 g | 80 | 63–64.5°C | satisfactory |
| 4c | 3 | 49.1 g | 77.4 | 62–63°C | satisfactory |
| 4d | 2 | 49.5 g | 78 | 57–59°C | unsatisfactory |
| 4e | 1.5 | 47.8 g | 75.4 | 56–58°C | unsatisfactory |
| 4f | 1 | 40.0 g | 63.1 | 48–51°C | unfeasible |
| 4g | 0.5 | 28.8 g | 45.4 | 43–48°C | unfeasible |
| 4h | 0 | 0 g | 0 | — | — |

It will be realized that all parts (especially percentages) set forth herein are intended to cover parts by weight (especially percent by weight) unless otherwise specifically indicated.

Furthermore, although for convenience formaldehyde and paraformaldehyde have been used interchangeably herein, for the purposes of the various molar quantities and molar ratios in question, the formaldehyde form ($CH_2O$) is intended rather than the paraformaldehyde form [$(CH_2O)_3$].

It will be realized that while it is preferred to use equimolar amounts of such three starting components, as the artisan will appreciate, when unequal molar amounts of such three starting components are used, the yield will depend directly upon the molar amount of that one of the three starting components which is present in the lowest molar amount as compared with the amounts of the other two of such starting components. The at least 3 mols of HCl used, of course, will be measured in terms of that starting component which is present in such lowest molar amount. Generally, however, the at least 3 mols of HCl will be measured in terms of the molar amount of benzazimide present, e.g. in the molar ratio of 3–7:1 of HCl (35–98 percent, preferably 37–98 percent, concentration) to benzazimide regardless of the molar amounts of the other two starting components present.

Advantageously, in accordance with the present invention, in the foregoing formulae I, IX and X:

$R_1$ and $R_2$ each respectively represents, i.e., identical or different, alkyl such as methyl, ethyl, n-propyl, isopropyl, n-butyl, isobutyl, sec.-butyl, tert.-butyl, amyl, hexyl, heptyl, octyl, nonyl, decyl, undecyl, dodecyl, and the like, especially $C_{1-12}$ alkyl, more especially lower alkyl and particularly $C_{1-4}$ alkyl;

alkenyl such as vinyl, $\alpha$-, $\beta$- and $\gamma$- allyl, propenyl, butenyl, pentenyl, hexenyl, heptenyl, octenyl, nonenyl, decenyl, undecenyl, dodecenyl, and the like, especially $C_{2-12}$ alkenyl, more especially lower alkenyl and particularly $C_{2-4}$ alkenyl;

cycloalkyl such as cyclopentyl, cyclohexyl, cycloheptyl, cyclooctyl, and the like, especially $C_{5-8}$ cycloalkyl, more especially $C_{5-6}$ cycloalkyl and particularly cyclohexyl;

alkoxy such as methoxy, ethoxy, n-propoxy, isopropoxy, n-butoxy, isobutoxy, sec.-butoxy, tert.-butoxy, amyloxy, hexyloxy, heptyloxy, octyloxy, nonyloxy, decyloxy, undecyloxy, dodecyloxy, and the like, especially $C_{1-12}$ alkoxy, more especially lower alkoxy and particularly $C_{1-4}$ alkoxy;

cycloalkoxy such as cyclopentyloxy, cyclohexyloxy, cycloheptyloxy, cyclooctyloxy, and the like, especially $C_{5-8}$ cycloalkyloxy, more especially $C_{5-6}$ cycloalkyloxy and particularly cyclohexyloxy; and aryl such as phenyl, naphthyl, and the like, especially mono- and di-nuclear aryl, more especially $C_{6-10}$ aryl and particularly phenyl.

Preferably, $R_1$ and $R_2$ are symmetrical or asymmetrical $C_{1-4}$ alkoxy; or $R_1$ and $R_2$ are symmetrical $C_{1-4}$ alkyl; or $R_1$ is $C_{1-4}$ and $R_2$ is $C_{1-4}$ alkoxy.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for the production of S-(3,4-dihydro-4-oxo-1,2,3-benzotriazine-3-yl-methyl)-thionothiol phosphorus acid ester having the formula

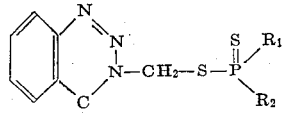

in which $R_1$ and $R_2$ each respectively is selected from the group consisting of (alkyl, alkenyl, cycloalkyl, alkoxy, cycloalkoxy, and aryl), alkyl, alkenyl or alkoxy of up to four carbon atoms, cycloalkyl or cycloalkoxy of five to six carbon atoms, phenyl and naphthyl, which comprises condensing paraformaldehyde, benzazimide and thionothiol phosphorus acid having the formula

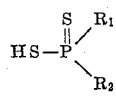

in which $R_1$ and $R_2$ are the same as defined above, in the presence of at least 37 percent concentration hydrogen chloride, to form the corresponding acid ester.

2. Process according to claim 1 wherein said condensing is carried out at a temperature substantially between about 30°–80°C.

3. Process according to claim 1 wherein said condensing is carried out in the presence of an inert organic solvent.

4. Process according to claim 3 wherein said inert organic solvent is selected from the group consisting of aliphatic hydrocarbon, chlorinated aliphatic hydrocarbon, aromatic hydrocarbon, chlorinated aromatic hydrocarbon, and mixtures thereof.

5. Process according to claim 1 wherein said hydrogen chloride is in the form of an aqueous hydrochloric acid solution.

6. Process according to claim 5 wherein said condensing is carried out in an inert gas atmosphere.

7. Process according to claim 1 wherein said hydrogen chloride is in the form of gaseous hydrogen chloride.

8. Process according to claim 1 wherein substantially equimolar amounts of said paraformaldehyde, benzazimide, and thionothiol phosphorus acid are used.

9. Process according to claim 1 wherein said paraformaldehyde and said benzazimide are used in the form of the corresponding formaldehyde condensation product, N-hydroxymethyl-benzazimide, and condensed directly with said thionothiol phosphorus acid in the presence of said hydrogen chloride.

10. Process according to claim 1 wherein said paraformaldehyde and said thionothiol phosphorus acid are used in the form of the corresponding formaldehyde condensation product, thionothiol-phosphorus acid-S-hydroxymethyl ester, and condensed directly with said benzazimide in the presence of said hydrogen chloride.

11. Process according to claim 1 wherein said thionothiol phosphorus acid is used in the form of the corresponding salt selected from the group consisting of alkali metal and ammonium salts and said hydrogen chloride is present in a sufficient excess to convert said salt to the corresponding free acid form.

12. Process according to claim 1 wherein $R_1$ and $R_2$ are symmetrical $C_{1-4}$ alkoxy.

13. Process according to claim 1 wherein $R_1$ and $R_2$ are asymmetrical $C_{1-4}$ alkoxy.

14. Process according to claim 1 wherein $R_1$ is $C_{1-4}$ alkyl and $R_2$ is $C_{1-4}$ alkoxy.

15. Process according to claim 1 wherein $R_1$ and $R_2$ are symmetrical $C_{1-4}$ alkyl.

16. Process according to claim 1 wherein $R_1$ and $R_2$ are methoxy.

17. Process according to claim 1 wherein $R_1$ and $R_2$ are ethoxy.

18. Process according to claim 1 wherein $R_1$ is methoxy and $R_2$ is isopropoxy.

19. Process according to claim 1 wherein $R_1$ is methoxy and $R_2$ is methyl.

20. Process according to claim 1 wherein $R_1$ is isopropoxy and $R_2$ is methyl.

21. Process according to claim 1 wherein $R_1$ and $R_2$ are methyl.

22. Process according to claim 2 wherein said condensing is carried out in the presence of an inert organic solvent selected from the group consisting of aliphatic hydrocarbon, chlorinated aliphatic hydrocarbon, aromatic hydrocarbon, chlorinated aromatic hydrocarbon, and mixtures thereof, and wherein substantially equimolar amounts of said paraformaldehyde, benzazimide, and thionothiol phosphorus acid are used.

23. Process for the production of S-(3,4-dihydro-4-oxo-1,2,3-benzotriazine-3-yl-methyl)-thionothiol phosphorus acid ester having the formula

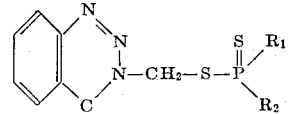

in which $R_1$ and $R_2$ each respectively is selected from the group consisting of (alkyl, alkenyl, cycloalkyl, alkoxy, cycloalkoxy, and aryl) alkyl, alkenyl or alkoxy of up to four carbon atoms, cycloalkyl of five to six carbon atoms, phenyl and naphthyl, which comprises condensing substantially equimolar amounts of paraformaldehyde, benzazimide and thionothiol phosphorus acid having the formula

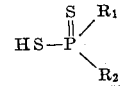

in which $R_1$ and $R_2$ are the same as defined above, in the presence of at least 3 moles of hydrochloric acid having a concentration of at lease 35% HCl per mole of said paraformaldehyde, benzazimide, and thionothiol phosphorus acid ester.

24. Process according to claim 23 wherein said condensing is carried out in the presence of 3-7 mols of hydrochloric acid having a concentration of at least 37% HCl per mol of said paraformaldehyde, benzazimide, and thionothiol phosphorus acid ester.

25. Process according to claim 23 wherein said paraformaldehyde and said benzazimide are used in the form of the corresponding formaldehyde condensation product, N-hydroxymethylbenzazimide, and condensed directly with said thionothiol phosphorus acid in the presence of said hydrochloric acid.

26. Process according to claim 23 wherein said paraformaldehyde and said thionothiol phosphorus acid are used in the form of the corresponding formaldehyde condensation product, thionothiol-phosphorus acid-S-hydroxymethyl ester, and condensed directly with said benzazimide in the presence of said hydrochloric acid.

27. Process according to claim 23 wherein said thionothiol phosphorus acid is used in the form of the corresponding salt selected from the group consisting of alkali metal and ammonium salts and said hydrochloric acid is present in a sufficient excess to convert said salt to the corresponding free acid form.

* * * * *

UNITED STATES PATENT OFFICE
CERTIFICATE OF CORRECTION

Patent No. 3,682,910         Dated August 8, 1972

Inventor(s) Reimer Colln

It is certified that error appears in the above-identified patent and that said Letters Patent are hereby corrected as shown below:

Abstract, 3rd last line

After "dihydro-" insert -- 4-oxo-1,2,3-benzotriazine-3-yl-methyl)-thionothiol --.

Col. 10, line 34

"when" should be -- then --.

Col. 12, line 24

"hydrochloric" should be -- hydrochloride --.

Col. 13, lines 3-9

"95%                        -- 95%
           should be           ↓
 0% "                          0% --

UNITED STATES PATENT OFFICE
CERTIFICATE OF CORRECTION

Patent No. 3,682,910                    Dated August 8, 1972

Inventor(s) Reimer Colln                         - 2 -

It is certified that error appears in the above-identified patent and that said Letters Patent are hereby corrected as shown below:

Col. 16, line 35

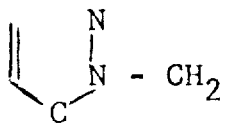   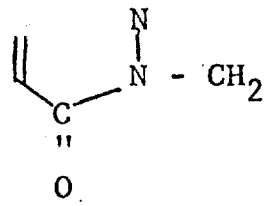

Foreign Application Priority Data

"June 26, 1966" should be -- June 25, 1966 --.

Signed and sealed this 1st day of May 1973.

(SEAL)
Attest:

EDWARD M. FLETCHER, JR.                ROBERT GOTTSCHALK
Attesting Officer                      Commissioner of Patents